(12) United States Patent
Thron et al.

(10) Patent No.: US 7,035,319 B2
(45) Date of Patent: Apr. 25, 2006

(54) METHOD AND APPARATUS FOR DETERMINING WHETHER A RECEIVED SIGNAL INCLUDES A DESIRED SIGNAL

(75) Inventors: Chris Thron, Austin, TX (US); Chengke Sheng, Austin, TX (US); Ivra Leon Turner, Pflugerville, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 813 days.

(21) Appl. No.: 10/210,348

(22) Filed: Jul. 31, 2002

(65) Prior Publication Data

US 2004/0022301 A1 Feb. 5, 2004

(51) Int. Cl.
*H04B 1/707* (2006.01)
(52) U.S. Cl. ...................... 375/148; 375/150
(58) Field of Classification Search ........ 375/142–145, 375/148–150, 152; 342/378, 417, 445; 370/320, 370/335, 342, 441
See application file for complete search history.

(56) References Cited

U.S. PATENT DOCUMENTS

| | | | | |
|---|---|---|---|---|
| 6,064,338 | A | 5/2000 | Kobayakawa et al. | 342/378 |
| 6,225,948 | B1 * | 5/2001 | Baier et al. | 342/417 |
| 6,351,238 | B1 * | 2/2002 | Kishigami et al. | 342/445 |
| 6,369,757 | B1 * | 4/2002 | Song et al. | 342/378 |
| 6,483,459 | B1 * | 11/2002 | Hou et al. | 342/378 |

OTHER PUBLICATIONS

Bing Wang and Hyuck M. Kwon; "PN Code Acquisition With Adaptive Antenna Array and Adaptive Threshold for DS-CDMA Wireless Communications"; 0-7803-6451-1/00, 2000 IEEE, pp. 152-156.

JeongHo Kim, Yash M. Vasavada, Jeffrey H. Reed; "Spatio-Temporal Searcher Structure for 3G W-CDMA Smart Antenna Systems"; 0-7803-7005-8/01, 2001 IEEE, pp. 1635-1639.

Sangehoon Kim and Scott L. Miller; "Subspace-Based Synchronization Using Antenna Array for DS-CDMA Signals in Multipath Time-Varying Fading Channels"; 0-7803-5718-3/00, 2000 IEEE, pp. 547-551.

* cited by examiner

*Primary Examiner*—Don N. Vo
(74) *Attorney, Agent, or Firm*—Charles W. Bethards

(57) ABSTRACT

A method of and data processing system for determining whether a received signal in a Code Division Multiple Access system that uses an antenna array includes a desired signal with a predetermined timing offset, the method including correlating 607 the received signal with a spreading code having the predetermined timing offset and corresponding to the desired signal at each element of the antenna array to provide correlations; determining 613 a power distribution, such as a DFT, corresponding to the correlations that is a function of a direction of arrival of the received signal; comparing 614 a magnitude of the power distribution at a first direction of arrival to a threshold that has a value that varies with the direction of arrival; and when the threshold is satisfied, determining 619 or indicating that the desired signal is likely present at the first direction of arrival.

43 Claims, 9 Drawing Sheets

METHOD AND APPARATUS FOR DETERMINING WHETHER A RECEIVED SIGNAL INCLUDES A DESIRED SIGNAL

FIELD OF THE INVENTION

This invention relates in general to communication receivers, and more specifically to a method and apparatus for determining whether a received signal includes a desired signal.

BACKGROUND OF THE INVENTION

Communications systems and particularly wireless communications systems have become relatively more complex and have greater system capacities and higher operating frequencies. There are many more variations in such systems and more adaptations of those systems to provide service to ever increasing numbers of users, many with greater bandwidth requirements. Many of these systems now use antenna arrays and smart or adaptive antenna arrays to help satisfy these capacity requirements. For example, adaptive antenna arrays are contemplated for Code Division Multiple Access (CDMA) systems such as CDMA 2000, Wideband CDMA (W-CDMA), Universal Mobile Telecommunications System (UMTS) and 3GPP to name a few.

Antenna arrays allow for antenna gains to be relatively higher in certain directions than in other directions. Smart or adaptive antennas are arranged to adjust or vary the direction of the lobes or beams that form the antenna gain pattern. These beams or relatively higher antenna gains may be adapted or steered to point in different directions. In interference limited systems such as those noted above and most modern systems adaptive antenna arrays can provide dramatic improvements in system capacity—in effect decreasing interference from one user to another. This however presents a problem when it is not known what the direction of arrival may be for a desired signal. A receiver and associated control elements or resources will need to make an initial determination as to whether a desired signal is present in a received signal. This can use a significant amount of signal processing resources and errors in the detection of the desired signal will use more such resources.

The problem can be exacerbated when as is typical the desired signal is arriving via numerous multipaths many with unique directions of arrival and it may be required or desirable to receive, combine and otherwise process several of these multipaths in order to establish and maintain a link with a user via the desired signal. The problem gets even bigger at an uplink receiver for a base station transceiver where the receiver is attempting to establish or provide service for tens or hundreds of users each with an unknown direction of arrival for a plurality of multipaths. As system capacities increase the problem gets larger. Often the function that addresses this problem is referred to as a searcher and known such functions tend to use extensive signal processing resources and also tend to be error prone.

What is needed is a method and apparatus that can efficiently determine whether a received signal includes a desired signal.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENT

Figure 1:
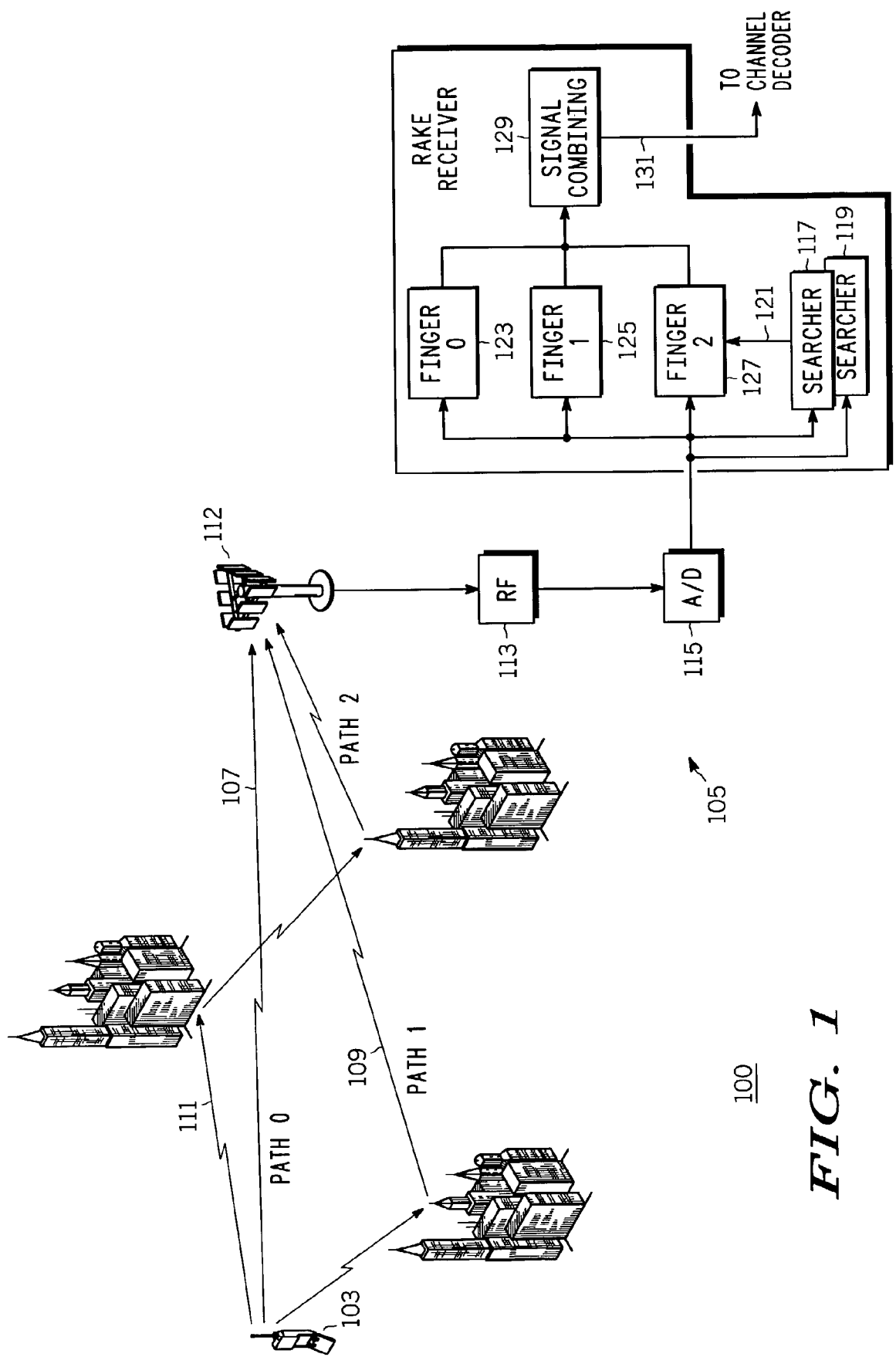
FIG. 1 depicts a system and receiver block diagram of a chip rate receiver suitable for using an embodiment according to the present invention.

In overview form the present disclosure concerns communications systems that utilize receivers to provide service for communications units or more specifically user thereof operating therein. More particularly various inventive concepts and principles embodied as methods and apparatus for quickly and efficiently determining whether a received signal includes a desired signal are discussed and disclosed. The communications systems of particular interest are those being deployed and developed such as CDMA, W-CDMA, CDMA2000, UMTS, 3GPP and other 2.5G or 3G systems that utilize spread spectrum or variations and evolutions thereof that make use of or will make use of adaptive antenna arrays in order to provide high communications capacities to users. Most of the discussion herein will relate to CDMA systems however the concepts and principles will have similar application to other systems such as GSM, GPRS, EDGE, TETRA, iDEN should they choose to employ adaptive antenna arrays.

As further discussed below various inventive principles and combinations thereof are advantageously employed to facilitate a desired signal present determination for a desired signal having an unknown direction of arrival. The determination is accomplished quickly, accurately and efficiently without an undue burden on processing resources or other facilities thus alleviating various problems associated with known systems and techniques while still facilitating cost effective and high performance signal present determinations provided these principles, concepts, or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts employed by the preferred embodiments.

Referring to FIG. 1, a combination system diagram and receiver block diagram of a multipath or rake receiver suitable for using various embodiments according to the principles and concepts herein is depicted and will now be discussed and described. FIG. 1 will be used to introduce certain concepts and define common terms that will be used throughout the present disclosure. FIG. 1 shows a known CDMA system 100 including a subscriber unit or device, such as a handset or messaging device or the like that is provided service by the system. The subscriber device is shown transmitting a signal to a base or base station transceiver 105. As depicted this signal will traverse a multiplicity of unique and varying length paths with three depicted, namely path0 107, path1 109 and path2 111.

The signal from the subscriber unit will arrive at an antenna or antenna array 112 for the base transceiver via these multipath signals, each at an unknown and different timing offset due to the unknown and different path lengths. Furthermore these desired signals will arrive at the antenna array 112 together with a potentially large number of signals from other subscriber units (not depicted) via there respective multipaths. The signals originating at other subscriber units together with channel noise and perhaps other interfering signals will collectively represent interference plus noise with respect to the desired signal from the subscriber unit 103.

The receive signal is intercepted by the antenna array 112 and coupled to a known radio frequency processing block 113 where it is amplified, filtered, down converted to base band, etc and then converted from an analog signal to a digital signal by the A/D 115. This digital signal is made available to one or more searchers (two depicted) 117, 119 as well as finger receivers (three depicted) 123, 125, 127. As is known the searcher is a name used to describe the function of making an initial determination of whether a desired signal (one or more multipaths) is present within the received signal as well as making an initial timing estimate. This is normally the first step in synchronizing the received spread spectrum signal and is also known as acquiring the spread spectrum signal. This information is provided to the known finger receivers and the fingers track or maintain synchromniztion with the multipaths (finger0 tracks mulipath or path0 etc.) and combine 129 and demodulate the outputs of the fingers to provide a demodulated desired signal at 131 to the channel decoder. Often the portion described and depicted is referred to as chip rate processing whereas the balance may be referred to as symbol rate processing with both functions collectively representing a receiver.

In this disclosure the focus is on an efficient implementation of the searchers, particularly where they are coupled to a linear antenna array. Other antenna array configurations can use the same or similar embodiments of the searchers although the particular mathematics and specific implementations will change to some extent. Searchers as earlier noted are responsible for the process of searching for signal multipaths to be demodulated by the balance of the receiver and are required to find a new user's signal or may be used to find additional multipaths for an existing user so as to improve that user's signal to interference plus noise ratio (SINR). Path search is a critical part of CDMA uplink chip rate processing performed at the base station receiver. In WCDMA (Wideband CDMA), path search is even more important, because the number of paths increases (since the time resolution increases—chip rate increases to 3.84 Mcps), and the paths themselves are more transient in nature.

The search problem is further exacerbated in Smart or adaptive array antenna (SA) systems, because beam forming enables an increase in system capacity, which leads in turn to a reduction of SINR (Signal to Interference-and-Noise Ratio) in the path search process. Furthermore, there is the need to locate or determine the incoming signal's direction as well as timing, which can provide favorable initial conditions for the beam-former (not depicted but generally known). Hence the need for a high-performance search algorithm that may be used in Smart Antenna systems. The searcher attempts to locate a signal whose timing lies within a given window (the window is specified by the system). Each possible timing is referred to as an "offset" or timing offset, and the searcher tests each possible offset for the presence of a desired signal.

Typically, these offset tests involve the measurement of an energy obtained through the square of a correlation. Those offsets with large energies are considered candidates for further processing. A searcher may have a multi-stage design, in which each stage involves offset testing as described above. Clearly the type of offset measurement used is critically important in determining the performance of the searcher and process thereof. Due to the noise including interference present in the system, any type of measurement will miss some genuine offsets, and will pass some offsets at which no signal is present: these two types of errors are referred to as missed detections and false alarms, respectively. An efficacious measurement scheme will reduce both false alarm and missed detection rates, while maintaining a low computational cost.

In the preferred embodiments as noted earlier we will be discussing CDMA and specifically W-CDMA systems. In such systems an inbound control channel, commonly designated dedicated physical control channel or DPCCH, is used and the subscriber unit sends control symbols on this channel that are spread via a spreading code or scrambling code to provide 3.84 Million chips per second where each control symbol is composed of 256 chips. The searcher will look for a desired signal, a signal from a particular subscriber or user on this control channel, that is included in a received signal that has been absorbed or received via an antenna array with K elements, such as 8 distinct elements.

Figure 2:
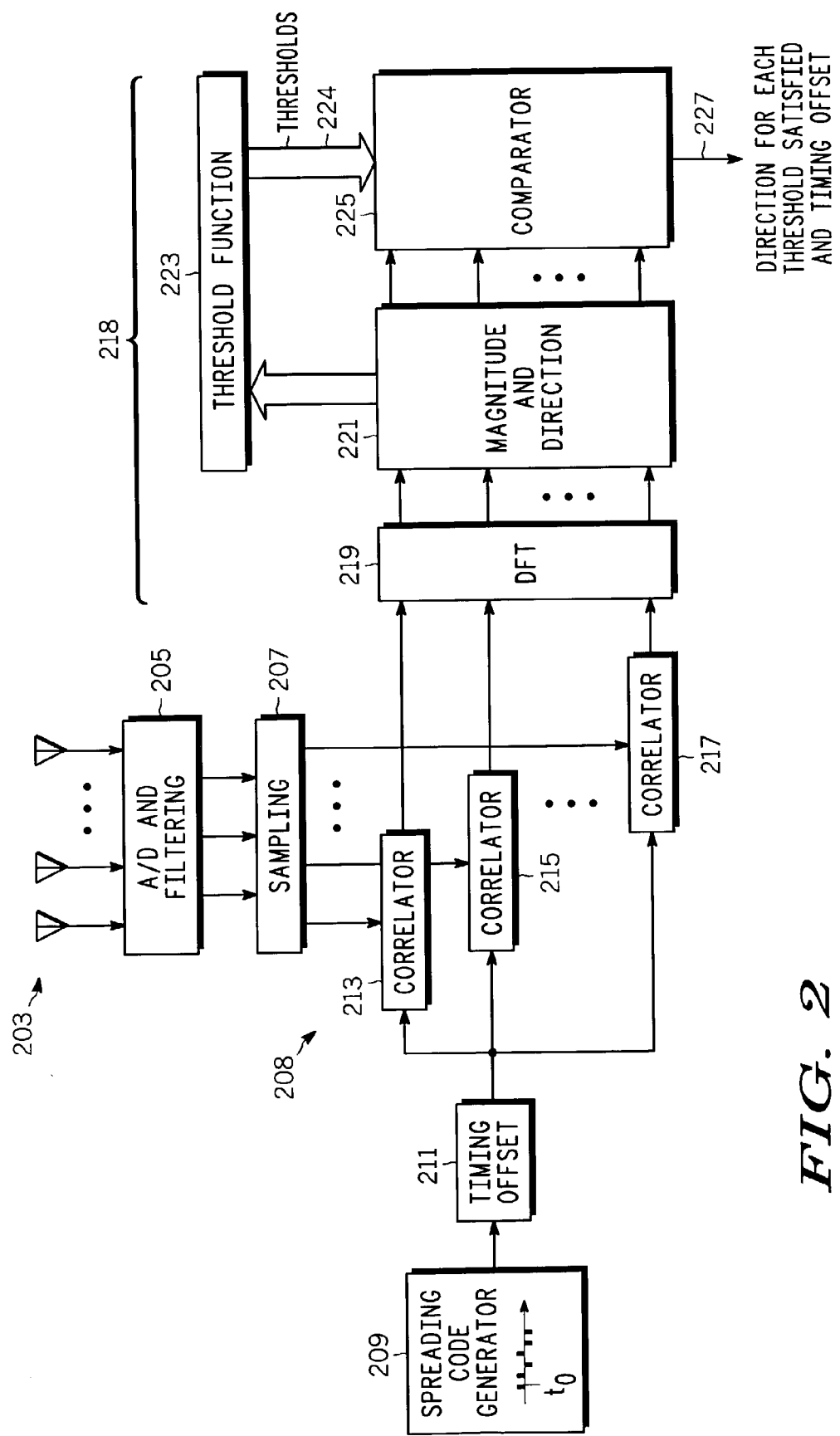
FIG. 2 illustrates a block diagram of a preferred embodiment of a data processing system suitable for use in the chip rate receiver of FIG. 1 according to the present invention.

Referring to FIG. 2 a block diagram of a preferred embodiment of a data processing system suitable for implementation in integrated circuit form and use in the chip rate receiver of FIG. 1 will be discussed and described. This discussion will include some mathematical development and definitional material. FIG. 2 depicts an antenna array 203 comprised of a plurality of elements, such as 8 elements that are arranged preferably as a linear array and operating to cover or receive signals in not more than a 180 degree sector, with a 120 degree sector preferable. The antenna array is coupled, element by element to an analog to digital converter and filter 205 and that is coupled to a sampler 207 that provides, after down conversion, samples of the digitized receive signal, antenna element by antenna element, to a correlation unit 208.

Further shown is a spreading code generator 209 that generates a spreading code that corresponds to the desired signal. The spreading code from the generator 209 is then adjusted temporally with the timing offset unit 211. Both the spreading code generator and timing offset unit are known in the art and both are controlled by the system and base station transceiver controller to generate appropriate spreading codes and timing offsets. The spreading code appropriately offset in time is applied to each of the correlators 213, 215, 217 where there is a correlator for each element of the antenna array. Note that in a preferred integrated circuit form where the data processing system is implemented as one or more integrated circuits a correlator or correlator function may be essentially time-shared amongst several elements of the antenna array however functionally the correlation unit operates the same as a correlator per antenna element. The correlation unit correlates the received signal with the spreading code corresponding to the desired signal at each element or a plurality of elements of the antenna array to provide correlations where the spreading or scrambling code has the predetermined timing offset.

Mathematically this may be represented as follows. Let $r_{k,n}$ denote the n'th control symbol received on the k'th antenna of a K-element, such as 8 element, adaptive antenna, that is, $$r_{k,n} = \Sigma_{i=1 \ldots 256} c_{k,256 \cdot n+i} \cdot b_{256 \cdot n+1}^*,$$

where $c_{k,t}$ is the t'th complex chip received on the k'th antenna, and $b_t$ is the t'th complex chip in the k'th search correlator's locally generated scrambling code sat the output of the timing offset 211. The '256' comes from the fact that each control symbol is comprised of 256 chips. If frequency correction is employed, then there is an additional factor:

$$r_{k,n} = \exp(-j \cdot n \cdot \phi) \cdot \Sigma_{i=1 \ldots 256} c_{k,256 \, n+i} \cdot b_{256 \cdot n+1}^*,$$

where $\phi$ is the estimated symbol rotation between successive control symbols. Let N be the number of control symbols per antenna element used in each offset energy measurement, and define $$R_{k,p} = \Sigma_{n=1 \ldots N} r_{k,p \cdot N+n},$$

which shall be referred to as the p'th 'searcher symbol' on the k'th antenna element. In the following discussion, the word "symbol" will always refer to searcher symbols $R_{k,p}$. We will also drop the subscript 'p' unless necessary. Note that the $R_{k,p}$ are the outputs from the respective correlators 213, 215, . . . , 217. Note that all of the antenna elements need not be used. For example four elements could be used or as we will discuss below as few as two of the elements may be used.

As alluded to above after obtaining the energy via the correlators we will need a decision metric by which to evaluate or compare the energy results in order to decide whether the desired signal is present in the received signal. For the coherent antenna element combination shown in FIG. 2 the offset energy used for signal detection is the maximum of directional energies associated with all possible directions of signal arrival (DOA):

$$T_{BC} = \max_\theta \{P(\theta)\}, \text{ where}$$

$$P(\theta) = |\Sigma_{k=1 \ldots K} R_k \cdot \exp(-2\pi j \cdot k \cdot \alpha \cdot \cos \theta)|^2.$$

This equation basically indicates that a coherent sum of the $R_k$s weighted by an exponential term resulting from the antenna array characteristics should be formed and then squared. Here $\alpha$ is the antenna spacing parameter: $\alpha = d/\lambda$, where d is the inter-antenna spacing and $\lambda$ is the carrier signal wavelength. We shall use $\alpha = \frac{1}{2}$, which is commonly viewed as an optimum choice.

The value of $\theta$ where $P(\theta)$ achieves a maximum, provided the maximum is sufficient is the estimated DOA for the desired signal at the present timing offset. Practically, $P(\theta)$ may be computed as follows: define $z \equiv \alpha \cdot \cos \theta$, which implies $\theta = \cos^{-1}(z/\alpha)$. Note that if $\alpha = \frac{1}{2}$ (usual choice), the range of z is $-\frac{1}{2} \leq z \leq \frac{1}{2}$. In the following, we will assume $\alpha = \frac{1}{2}$ (other cases are similar). Changing variable $\theta \to z$ in the expression for $P(\theta)$, we find $$P(z) = |\Sigma_{k=1 \ldots K} R_k \cdot \exp(-2\pi j \cdot k \cdot z)|^2.$$

Note that $P(1-z) = P(z)$. We define a new variable w in terms of z as $$w = z \quad 0 \leq z \leq \frac{1}{2}$$

$$w = 1 - z \quad -\frac{1}{2} \leq z < 0$$

The range of w is now $0 \leq w < 1$. If we define a maximum index Q, which is a power of 2, and write w as a rational number $$w = q/Q, \quad q = 0, \ldots Q-1$$

we then have $$P(q) = |\Sigma_{k=1 \ldots K} R_k \cdot \exp(-2\pi j \cdot k \cdot q/Q)|^2,$$

which is simply the square of the Q-point discrete Fourier transform (DFT) of $R_1 \ldots R_K$:

$$P(q) = |DFT_Q\{[R_1 \ldots R_K]\}(q)|^2.$$

To recover $P(\theta)$, we simply reverse the change of variables from $\theta$ to z to w:

$$\theta_q = \cos^{-1}(2 \cdot q/Q) \quad 0 \leq q \leq Q/2;$$

$$\theta_q = \cos^{-1}(1 - 2 \cdot q/Q) \quad -Q/2 \leq q < 0.$$

There is considerable computational savings by employing the DFT rather than direct computation, because the number of multiply-accumulate operations required to compute the complete DFT is $4 \cdot Q \cdot \log_2 Q$, whereas a direct computation would require $4 \cdot Q^2$. The more points in the DFT, the more accurate the representation of $P(\theta)$ (that is, there is a finer mesh of values of $\theta$ for which $P(\theta)$ is known).

More specifically the detection signal used in FIG. 2 is a ratio namely:

$$T_{IN} = \max_\theta \{P(\theta)/\mu_0(\theta)\}, \text{ where}$$

$$P(\theta) \equiv |\Sigma_{k=1 \ldots K} R_k \cdot \exp(-2\pi j \cdot k \cdot \alpha \cdot \cos\theta)|^2, \text{ and}$$

$$\mu_0(\theta) \equiv \text{interference power profile estimate}.$$

The details of computing $\mu_0(\theta)$ are given below. The DOA estimate associated with $T_{IN}$ is:

$$\theta_{INest} = \arg[\max_\theta \{P(\theta)/\mu_0(\theta)\}].$$

With the above as background consider the statistical properties of actual detection signals as received and the following definitional material. The received antenna symbols can be written as:

$$R_{k,p} \equiv S_{k,p} + I_{k,p},$$

where $S_{k,p} \equiv$ true signal and $I_{k,p} \equiv$ noise+interference.

We suppose also that the true signal comes from a fixed user direction $\phi$, so that $$S_{k,p} = S_p \cdot \exp(2\pi j \cdot k \cdot \alpha \cdot \cos\phi).$$

Furthermore, we suppose that the interference is caused by u=1 ... U multipaths with associated directions $\psi_u$, so that $$I_{k,p} = \Sigma_{u=1 \ldots U} I_{u,p} \eta_{u,p} \cdot \exp(2\pi j \cdot k \cdot \alpha \cdot \cos\psi_u),$$

where $I_{u,p}$ is the fading amplitude for multipath u, $\eta_{u,p}$ is a complex Gaussian which expresses the correlation between the scrambling codes of multipath u and the current timing offset spreading code.

For the coherent antenna configuration of FIG. 2 We may compute $$P(\theta) \equiv \left|\sum_{k=1\ldots K} \{S_k + I_k\} \cdot \exp(-2\pi j \cdot k \cdot \alpha \cdot \cos\theta)\right|^2$$

$$= \left|\sum_{k=1\ldots K} S_k \cdot \exp(-2\pi j \cdot k \cdot \alpha \cdot \cos\theta)\right|^2 +$$

$$\left|\sum_{k=1\ldots K} I_k \cdot \exp(-2\pi j \cdot k \cdot \alpha \cdot \cos\theta)\right|^2 +$$

$$2 \cdot \text{Re}\left\{\sum_{k=1\ldots K} S_k^* \cdot \exp(2\pi j \cdot k \cdot \alpha \cdot \cos\theta) \cdot \right.$$

$$\left. \sum_{k=1\ldots K} I_k \cdot \exp(-2\pi j \cdot k \cdot \alpha \cdot \cos\theta)\right\}.$$

For offsets at which there is no true signal, we have an interference power distribution $$P_0(\theta) \equiv |\Sigma_{k=1 \ldots K} I_k \cdot \exp(-2\pi j \cdot k \cdot \alpha \cdot \cos\theta)|^2,$$

which we may rewrite as $$P_0(\theta) \equiv |\eta(\cos\theta)|^2,$$

Where $\eta(z) \equiv \Sigma_{k=1 \ldots K} I_k \cdot \exp(-2\pi j \cdot k \cdot \alpha \cdot z)$. If we suppose as is reasonable that $\eta(z)$ for each z has a Gaussian distribution, it follows that $P_0(z)$ has a $\chi^2$ distribution with 1 degree of freedom. When the interference background is non-uniform (the interference power is a function of $\theta$ or DOA) as will ordinarily be the case when an adaptive antenna array thus beam forming is used, the peaks in the interference power profile $P_0(\theta)$ can produce false alarms, thus degrading the searcher performance. Generally this is the problem with various known searcher techniques and a problem that the structure and methods employed within FIG. 2 will resolve.

The apparatus of FIG. 2 solves this problem by normalizing the interference as follows. It was shown above that $P_0(\theta)$ has a $\chi^2(1)$ distribution for each $\theta$. It follows from the properties of $\chi^2(1)$ distributions that $$Pr\{P_0(\theta) > E\{P_0(\theta)\} \cdot x\} = f(x),$$

where f(x) is the tail probability function for the normalized $\chi^2(1)$ distribution. It follows that, in order to equalize false alarm probabilities over $\theta$, we should divide $P_0(\theta)$ by its expected value (Equalized false alarm probabilities are desirable, because then the noise is "whitened" over $\theta$). Now, the key fact here is that the distribution of the random variables $I_k$ is independent of the local scrambling or spreading code that is used to correlate (because if there is no true signal, all correlations between the local scrambling codes and the scrambling codes for different paths have identical complex Gaussian distributions). Hence, $E\{P_0(\theta)\}$ is the same for every scrambling code and timing offset at which no true signal is present. Thus, we will estimate $\mu_0(\theta) \equiv E\{P_0(\theta)\}$ by averaging energy results over timing offsets and local scrambling codes for which no signal has been found. It is not necessary to average over all of these offsets—just a sufficient number to get a reasonably accurate estimate.

So far we have considered false alarm probabilities as a function of $\theta$. In order to evaluate searcher performance, we also need to consider missed detection probabilities when a signal is present. When a true signal is present we have $$P(\theta) = P^\wedge(\theta) + P_0(\theta) + 2 \cdot \text{sqrt}[P^\wedge(\theta) \cdot P_0(\theta)] \cdot \zeta$$

where $$v(\cos\theta) \equiv \Sigma_{k=1 \ldots K} S_k \cdot \exp(-2\pi j \cdot k \cdot \alpha \cdot \cos\theta)$$

$$P^\wedge(\theta) \equiv |v(\cos\theta)|^2 = |\Sigma_{k=1 \ldots K} S_k \cdot \exp(-2\pi j \cdot k \cdot \alpha \cdot \cos\theta)|^2,$$

$$\zeta \equiv Re\{\exp(j \cdot \text{angle}[v(\cos\theta)^* \cdot \eta(\cos\theta)])\}.$$

Here $\zeta$ is a real random variable with an arccosine probability density ($-1 \leq \zeta \leq 1$).

Dividing by $\mu_0$ gives:

$$P(\theta)/\mu_0(\theta) = P^\wedge(\theta)/\mu_0(\theta) + P_0(\theta)/\mu_0(\theta) + 2 \cdot \text{sqrt}[P^\wedge(\theta) \cdot P_0(\theta)/\mu_0^2(\theta)] \cdot \zeta.$$

which has expectation and variance $$E\{P(\theta)/\mu_0(\theta)\} = P^\wedge(\theta)/\mu_0(\theta) + 1$$

$$Var\{P(\theta)/\mu_0(\theta)\} = 2 + 2 \cdot P^\wedge(\theta)/\mu_0(\theta),$$

where the factors of 2 in the variance equation are computed from variances of $\chi^2(1)$ and gaussian distributions. The ratio $P^\wedge(\theta)/\mu_0(\theta)$ is largest near the angle $\theta$ where the signal is coming from. Hence both expectation and variance are largest in the direction of a true signal. Note that the expectation and variance are normalized, so that the only parameter which appears is the normalized signal to noise ratio $P^\wedge(\theta)/\mu_0(\theta)$.

Referring again to FIG. 2 the correlation unit 208, specifically each correlator or the results there from are coupled to a processing unit 218 that includes a discrete Fourier transform (DFT) calculator 219, a magnitude and direction block 221, comparator 225, and threshold function 223 all inter-coupled as shown. In the preferred form the correlation unit can be implemented as one integrated circuit and the processing unit as another integrated circuit where either integrated circuit may be programmable. The DFT calculator will provide a power distribution that corresponds to the correlations that is a function of the direction of arrival of the received signal. Preferably, the power distribution is a discrete Fourier transform (DFT) corresponding to a set of the correlations from each of a plurality of element of the antenna array, the variable of each component of the DFT corresponding to a unique direction of arrival for the received signal. More specifically a DFT or N point DFT, where N is typically 8, of the correlations for each or a plurality of the elements of the antenna array is calculated and provided component or term by component or term to the magnitude and direction block 221. Each term or component of the DFT is a complex value including a magnitude and angle where the angle corresponds to a direction of arrival for the received signal. These magnitudes or, preferably, magnitudes squared are passed together with the corresponding angles or directions of arrivals to the comparator 225 as well as to the threshold function 223.

The threshold function determines a plurality of thresholds, each having a value that varies with or depends on the direction of arrival or angle. Preferably the threshold function is developed using the power distribution. More specifically an average DFT term or component magnitude is determined from current and past DFTs or power distributions and maintained for each angle or direction of arrival. These averages when multiplied by a heuristically determined number are the thresholds 224 that are supplied to the comparator 225 as shown. In sum for each of a plurality of directions of arrival, the processing unit develops the threshold function by averaging a corresponding magnitude of the power distribution with an earlier average corresponding to each of the plurality of directions of arrival to provide an updated average value for each of the plurality of directions of arrival The comparator compares a magnitude of the power distribution, preferably each of the DFT component magnitudes, at a first direction of arrival such as the corresponding angles of the DFT terms to the corresponding threshold having a value determined from the threshold function using the variable for the particular DFT component. When the threshold is satisfied the comparator determines or decides and indicates to the fingers at 227 that the desired signal is likely present with the predetermined timing offset at the direction of arrival corresponding to the threshold and magnitude being compared. This may be true for one or more of the DFT components. The above described apparatus and processes are particularly suited in whole or part for implementation in integrated circuit form as one or more integrated circuits or programmable integrated circuits, such as digital signal processors executing appropriate software programs or instructions. We have described an apparatus or circuit that is particularly suited and arranged and operable for determining whether a received signal at a Code Division Multiple Access (CDMA) receiver that is coupled to an antenna array includes a desired signal with a predetermined timing offset Referring to FIG. 3 a functional block diagram depicting in more detail the functional operation, including various optional processes, of the processing unit of FIG. 2 will be discussed and described. Accumulated searcher symbols 303 or correlations from the correlator unit 208 for a particular user or subscriber and a particular timing offset are coupled to a preliminary search 305. The preliminary search is optional and functionally, if included, would be implemented at the input to the processing unit of FIG. 2. The preliminary search may reduce the load on subsequent processing steps when properly implemented. The preliminary search is executed by comparing a function of the correlations to a screening threshold, $\tau_1$. When or if the screening threshold is satisfied, determining the power distribution 313 is undertaken.

One screening function that has been used is a sum, over the applicable elements of the antenna array, of a magnitude of a set of the correlations corresponding to each element squared, where the set of correlations is preferably a searcher symbol $R_k$. Basically if this sum is larger than a heuristically derived threshold there is a chance that a desired signal is present and then the process follows path 309 and further resources are devoted to the directional search, computing a DFT etc. When the screening threshold is not satisfied indicating there is little chance of a desired signal being present, path 307 is followed a fraction of the time such as 1/10 or 1/20 and the processing unit will update the threshold function by finding an interference power distribution 311 and averaging the interference power distribution with earlier interference power distributions. This amounts to finding a DFT 219 and averaging the magnitudes of each component or term of the DFT with earlier corresponding averages for those components in order to update $\mu_0(\theta)$, the expected value of the interference power at each direction of arrival where the DFT is known. The updated $\mu_0(\theta)$ is passed to the directional search 313.

The directional search calculates a DFT of the searcher symbols or correlations $R_k$ and compares this DFT magnitude term by term to a corresponding threshold $\tau_2$ times $\mu_0(\theta)$. This is analogous to the processing unit 218 processes discussed above with reference to FIG. 2. For each $\theta$ or direction of arrival where the corresponding threshold is satisfied an indication of user, timing offset, and DOA are passed to the fingers. One further optional function is the threshold adjustment function that may be used to adjust the screening threshold and directional search thresholds based on their respective throughput rates. The particulars of these thresholds will vary with each implementation of the concepts and principle disclosed herein and will need to be heuristically arrived at. The inventors suggest a simulation of the specific implementation in order to arrive at optimum thresholds.

Figure 3:
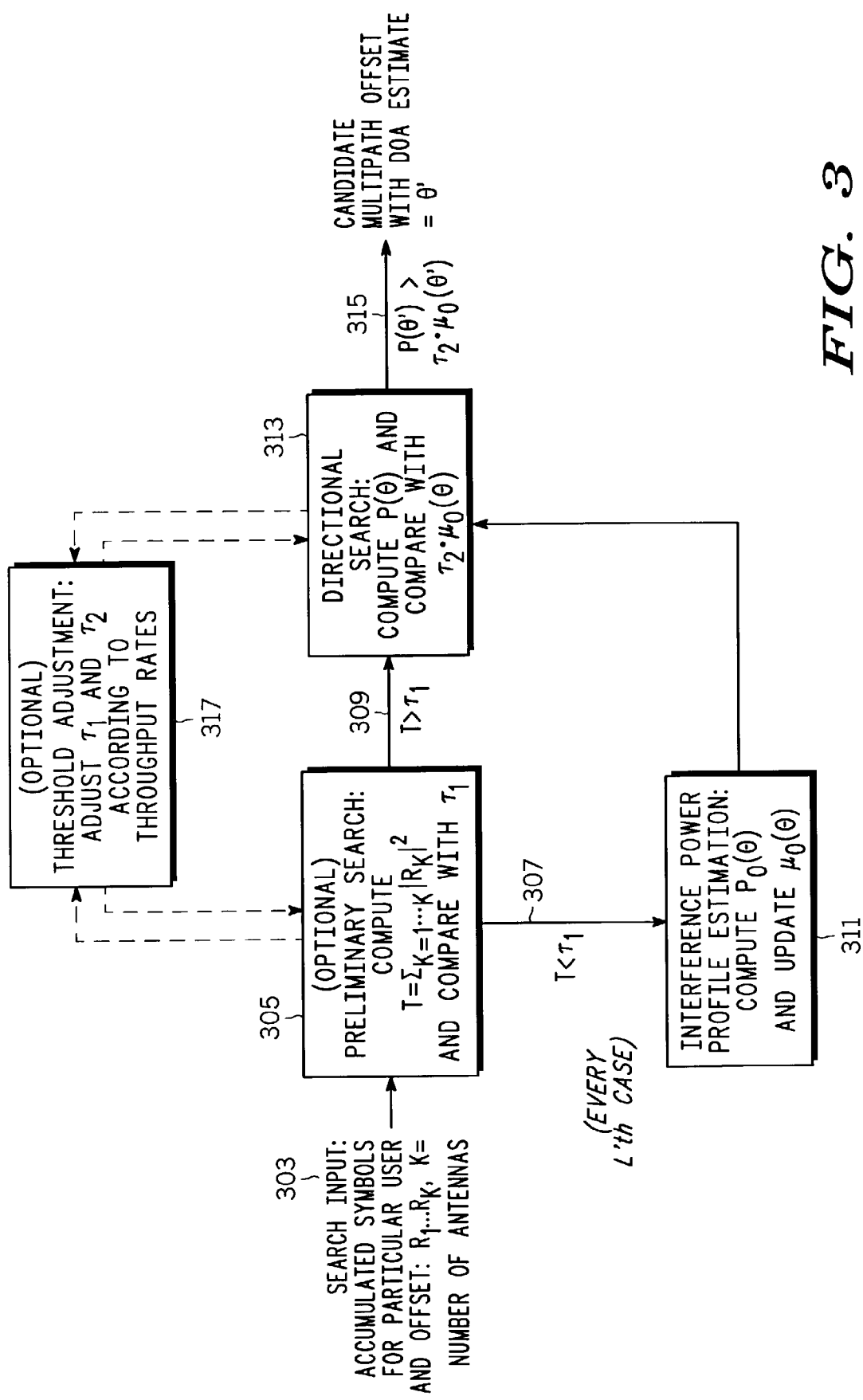
FIG. 3 illustrates a functional block diagram depicting in more detail the functional operation of the FIG. 2 data processing system.

The apparatus of FIGS. 2 and 3 is suited for processing received signals such as an inbound signal in a wideband CDMA system where the desired signal is a control channel signal having control symbols and corresponding to a subscriber unit. The correlations for each element of the antenna array are coherently summed to provide a plurality of symbols, one each for each element. In the preferred form determining the power distribution includes finding a discrete Fourier transform (DFT) of the plurality of symbols, where the DFT has a plurality of terms with each corresponding to a unique direction of arrival of the received signal. In this embodiment the threshold function has a value for each unique direction of arrival corresponding to an average of each term of the plurality of terms when the desired signal is not present.

One aspect or embodiment according to the present invention is a software program that when installed and operating on or being executed by a programmable integrated circuit will result in the integrated circuit facilitating determination of whether a received signal in a CDMA system that uses an antenna array includes a desired signal with a predetermined timing offset. In sum the software program includes instructions that perform much or all of the above discussed functionality as well as the functionality discussed herein below. The processes above and below can be advantageously undertaken by a target machine or processor executing the software instructions that have been designed and written according to the targeted machine executing the software program. The design and drafting details of the software program will be well within the capabilities of one of ordinary skill, given the discussions and disclosure herein. For example, the software program would include instructions that when executed perform or cause the target machine or processor to perform the methods discussed below with reference to FIGS. 6 and 7. Further the program is suitable for determining a power distribution corresponding to correlations provided by correlating a received signal with a spreading code corresponding to a desired signal at a plurality of elements of an antenna array, where the power distribution is a function of a direction of arrival of the received signal; comparing a magnitude of the power distribution at a first direction of arrival to a first threshold that has a value determined from a threshold function that varies with the direction of arrival; and when the first threshold is satisfied determining that the desired signal is likely present with the predetermined timing offset at the first direction of arrival.

Figure 4:
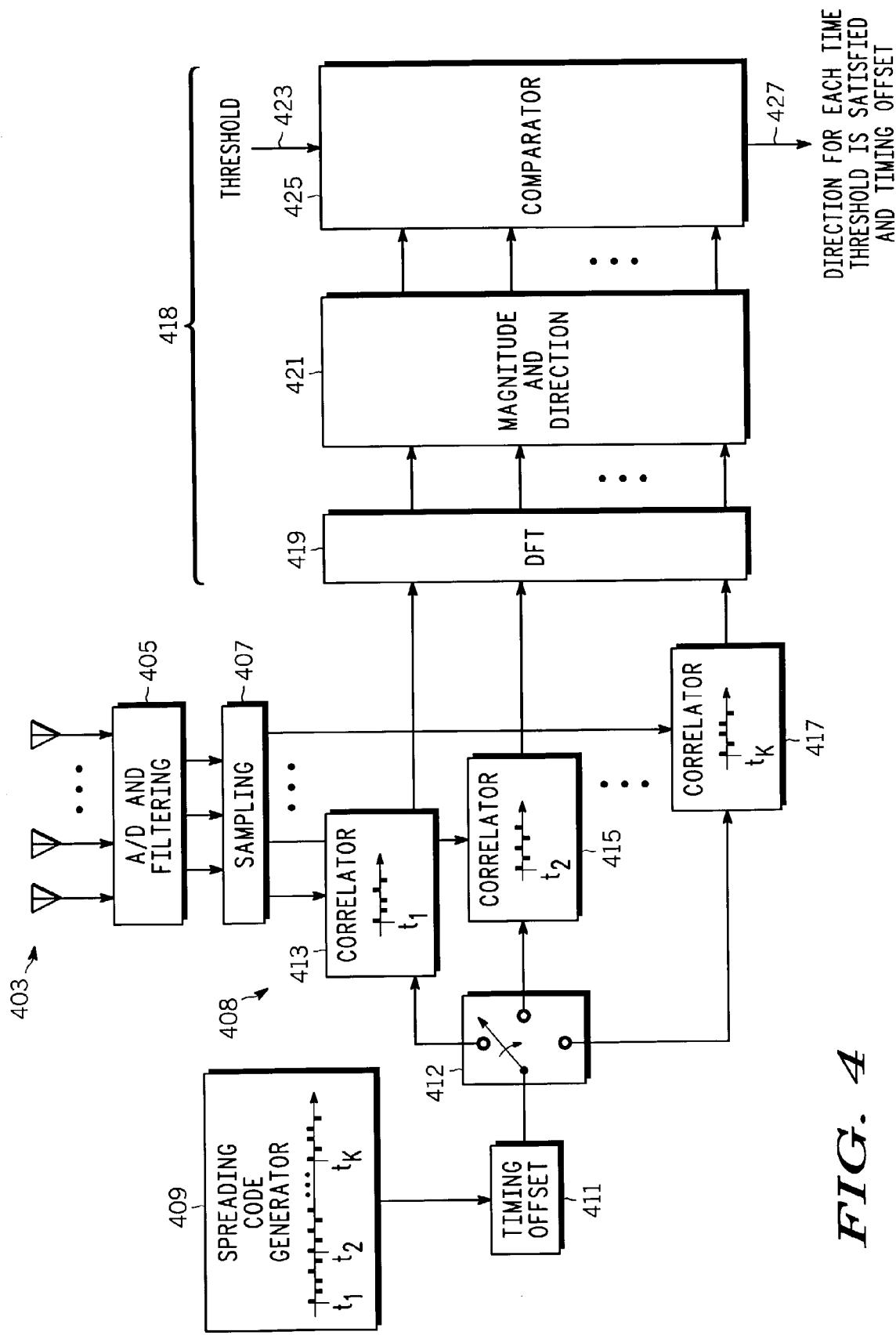
FIG. 4 shows another preferred embodiment of a block diagram of a data processing system suitable for use in the chip rate receiver of FIG. 1 according to the present invention.

Referring to FIG. 4 another preferred embodiment of a block diagram of a data processing system suitable for implementation in integrated circuit form and use in the chip rate receiver of FIG. 1 will be discussed and described. FIG. 4 again depicts an apparatus suitable for implementation as or within one or more integrated circuits that are arranged and constructed for determining whether a received signal at a Code Division Multiple Access receiver that is coupled to an antenna array includes a desired signal with a predetermined timing offset. The apparatus of FIG. 4 includes an antenna array 403 coupled to the A/D and filter 405 and sampler 407 all operating analogously to the corresponding functions of FIG. 2. The outputs from the sampler 407 are coupled to a correlation unit 408 that in overview is for correlating the received signal with a spreading code corresponding to the desired signal at a first element of the antenna array for a first time period to provide a first correlation and at a second element of the antenna array for a second time period that excludes the first time period to provide a second correlation, where the spreading code has the predetermined timing offset. Preferably the correlation unit further correlates the received signal with the spreading code corresponding to the desired signal at additional elements of the antenna array for additional unique time periods to provide additional correlations. The spreading code or scrambling code is supplied by spreading code generator 409. The spreading code is time adjusted according to the predetermined timing offset at 411. These operations are analogous to those described with reference to FIG. 2.

The spreading code as timing offset adjusted is coupled to a commutator 412 that couples a first portion beginning at $t_1$ with a known duration to correlator 413 and a second portion beginning at $t_2$ with the same known duration to a second correlator 415 and so on for additional portions with the same known duration to additional correlators including a $k^{th}$ portion beginning at $t_k$ to a $k^{th}$ correlator 417. Note that while the commutator 412 is shown in the spreading code path it could as well be in the antenna element signal paths coupling in turn the signal from each element to a correlator with a correlator output gated in synch with the antenna element commutator to the processing unit 418. The result of this arrangement that we will call a staggered combination is the removal of directional dependence from interfering signals.

Using the definitions from above an alternative to coherent combination of antenna energies is the decision statistic:

$T_{SC} = \max_\theta \{P_S(\theta)\}$, where $P_S(\theta) = |\Sigma_{k=1 \ldots K} R_{k,p+k} \cdot \exp(-2\pi j \cdot k \cdot \alpha \cdot \cos \theta)|^2$.

The corresponding DOA estimate is $\theta_{SCest} = \arg[\max_\theta \{P_S(\theta)\}]$.

The symbols used from different antenna elements are not simultaneous; and we allow for the possibility that a subset of the antenna elements is used, rather than all elements. We shall show that staggering the symbols decorrelates and "uniformizes" the interference on the different antenna elements, thereby eliminating searcher errors (false alarms) resulting from directional interference.

Again referring to the above definitions we can compute $$P_S(\theta) = \left| \sum_{k=1\ldots K} S_{k,p+k} \cdot \exp(-2\pi j \cdot k \cdot \alpha \cdot \cos\theta) \right|^2 +$$

$$\left| \sum_{k=1\ldots K} I_{k,p+k} \cdot \exp(-2\pi j \cdot k \cdot \alpha \cdot \cos\theta) \right|^2 +$$

$$2 \cdot \text{Re} \left\{ \sum_{k=1\ldots K} S^*_{k,p+k} \cdot \exp(2\pi j \cdot k \cdot \alpha \cdot \cos\theta) \cdot \sum_{k=1\ K} I_{k,p+k} \cdot \exp(-2\pi j \cdot k \cdot \alpha \cdot \cos\theta) \right\}.$$

For offsets at which there is no true signal, we have an interference power distribution $P_0(\theta) = |\Sigma_{k=1 \ldots K} I_{k,p+k} \cdot \exp(-2\pi j \cdot k \cdot \alpha \cdot \cos \theta)|^2$.

Now the $I_{k,p+k}$'s are uncorrelated and isotropic, which guarantees that $P_0(\theta)$ will be independent of $\theta$. It follows that, in distinction to coherent antenna combinations, there are no peaks in the interference power profile or distrbution. This translates into improved performance relative to prior art systems.

The processing unit 418 operates to determine a signal magnitude and a direction of arrival of the received signal corresponding to the first and the second correlation, compares the signal magnitude to a threshold, and when the threshold is satisfied determines and indicates that the desired signal is likely present with the predetermined timing offset at the direction of arrival. Preferably determining a signal magnitude includes determining a power distribution corresponding to the first correlation, the second correlation, and additional correlations, that is a function of the direction of arrival of the received signal. This power distribution is further preferably a discrete Fourier transform (DFT) determined by the DFT calculator 419 that corresponds to the first correlation, the second correlation, and additional correlations. The DFT components or terms are coupled to magnitude and direction block 421 where the magnitudes, such as absolute values or squared values are determined for each term or component and passed along with an angle or direction of arrival to the comparator 425.

The comparator compares the magnitude of each component of the DFT to the threshold 423, where the threshold corresponds to an interference level that is independent of the direction of arrival corresponding to the angle of the component. When the magnitude of any one of the components satisfies the threshold, eh comparator indicates at 427 that the desired signal is likely present with the predetermined timing offset at a direction of arrival corresponding to that or those components. The threshold 423 can best be heuristically arrived at via simulation or field experience with a particular embodiment of the principles and concepts disclosed and described herein.

Figure 5:
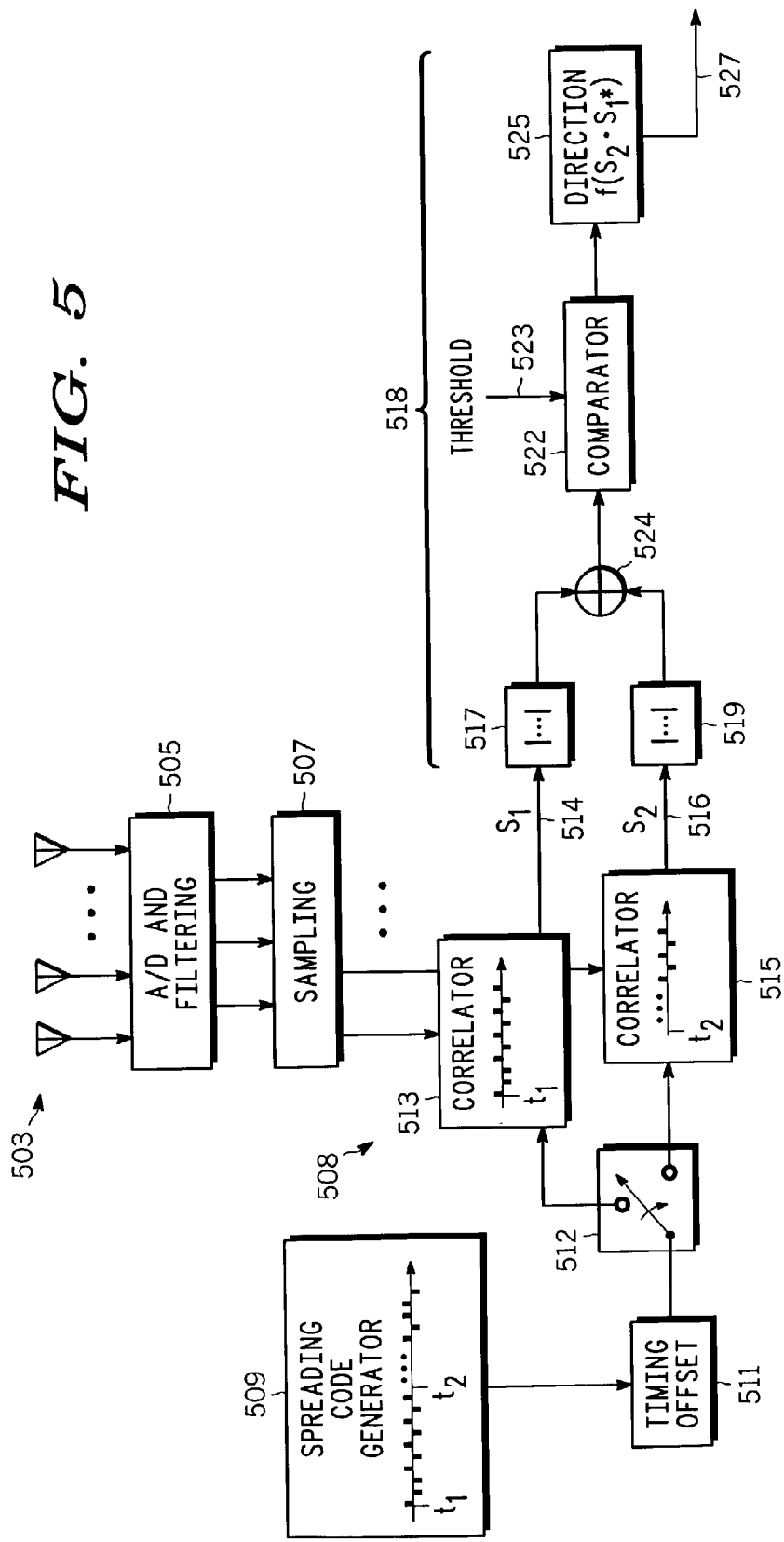
FIG. 5 shows a further block diagram embodiment of a data processing system suitable for use in the chip rate receiver of FIG. 1.

Referring to FIG. 5 a further block diagram embodiment of a data processing system suitable for implementation in integrated circuit form or as one or more integrated circuits and use in the chip rate receiver of FIG. 1 will be discussed and described. FIG. 5 depicts an apparatus that is similar to but a special case of the FIG. 4 block diagram, the apparatus being arranged and constructed for determining whether a received signal at a Code Division Multiple Access receiver that is coupled to an antenna array includes a desired signal with a predetermined timing offset. Specifically FIG. 5 shows two antenna elements being used for the searching process. FIG. 5 depicts an antenna array 503 coupled to an A/D and filter 505 that are operationally analogous to those of FIG. 4. The A/D 505 is coupled to a sampler 507 that samples at least two of the signals from two of the antenna elements to provide two sampled signals to a correlation unit 508. The correlation unit 508 is for correlating the received signal with a spreading code corresponding to the desired signal at a first element of the antenna array for a first time period to provide a first correlation and at a second element of the antenna array for a second time period that excludes the first time period to provide a second correlation, where the spreading code has the predetermined timing offset.

The spreading code is provided by a spreading code generator 509 and a predetermined timing offset is applied by the timing offset function 511 both operating in known fashion and analogously to similar functions as discussed above. These operations are controlled by a controller (not shown) that is also known. The spreading code or scrambling code from offset timing generator 511 is applied to a commutator 512 that operates to supply a portion of the spreading code beginning at $t_1$ and lasting for a known duration to correlator 513 and a second portion of the spreading code beginning at $t_2$ and lasting for the known duration to a second correlator 515. In this manner the received signal from one antenna element is correlated in a staggered or time staggered fashion from the correlation procedures for a second antenna element. Again the commutator 512 could as well be placed and arranged to successively gate the sampled signals from two of the antenna elements to a single correlator with an output synchronously gated to provide two signals. In any event the outputs from the correlation unit, namely $S_1$ 514 and $S_2$ 516 are coupled to a processing unit 518.

The processing unit is for determining a signal magnitude, preferably the magnitude 517, 519, respectively, of each correlation, $S_1$ 514 and $S_2$ 516 and then the sum 521 of these two magnitudes, and a direction of arrival of the received signal corresponding to the first and second correlations. The processing unit further includes a comparator 522 that compares the signal magnitude to a threshold 523. When the threshold is satisfied indicating that the desired signal is likely present with the predetermined timing offset the comparator passed an indication of that determination to a direction function 525 where the direction of arrival is determined. We will show that, determining the direction of arrival of the received signal uses a function of an angular difference between the first correlation and the second correlation.

Mathematically, using the definitions from above, this special case of staggered coherent antenna combination using exactly 2 antennas can be expressed and analyzed as follows. In this case, a detection signal may be formed from the symbols on two antennas as:

$$T_{SB} \equiv |R_{1,p+1}| + |R_{2,p+2}|$$

The advantage of this scheme is increased coherence gain for the same resource cost. For example, a staggered coherent antenna combination on 8 antennas requires 8 symbols per energy detection (recall the definition of "symbol" or searcher symbol), while the 2-antenna case requires only 2 symbols. Hence for the same resource cost, correlators and the like, the 2-antenna symbols can be 4 times as long (i.e. concatenate 4 times as many control symbols), which leads to increased coherence gain (as long as the signal is relatively constant over the entire symbol).

A DOA estimate $\theta_{SBest}$ may be derived from $T_{SB}$ as follows:

$$R_{2,p+2} = R_{1,p+1} \cdot \exp(2\pi j \cdot \alpha \cdot \cos \theta_{SBest}) \text{ which implies}$$

$$\theta_{SBest} = \arc \cos[(2\pi\alpha)^{-1} \cdot \text{angle}\{R_{2,p+2} \cdot R_{1,p+1}^*\}]$$

Just as in staggered coherent antenna combination (see FIG. 4 and above analysis), the staggering of symbols in the bi-antenna combination removes any angular dependence in the interference. In order to make a fair comparison between staggered bi-antenna and staggered multi-antenna combination, we consider the case with K antennas and searcher symbols $R_{k,p}$. In multi-antenna combination, we use K searcher symbols $R_{k,k+p}$ on K different antennas; in bi-antenna combination, for the same resource cost we may combine K/2 searcher symbols on each of 2 antennas, so that on the first antenna we have $$\sum_{q=1\ldots K/2} R_{1,p+q} = \sum_{q=1\ldots K/2} S_{1,p+q} + I_{1,p+q}$$
$$= \exp(2\pi j \cdot \alpha \cdot \cos\phi) \cdot \sum_{q=1\ldots K/2} S_{p+q} + \sum_{q=1\ldots K/2} I_{1,p+q},$$

while on the second antenna we have $$\sum_{q=K/2+1\ldots K} R_{2,p+q} = \sum_{K/2+1\ldots K} S_{2,p+q} + I_{2,p+q}$$
$$= \exp(2\pi j \cdot \alpha \cdot \cos\phi) \cdot \sum_{q=1\ldots K/2} S_{p+q} + \sum_{K/2+1\ldots K} I_{2,p+q},$$

When the fading Doppler frequency is small compared to the symbol frequency, we have $$S_{p+m} \approx S_p$$

which implies $$\Sigma_{q=1\ldots K/2} R_{1,p+q} \approx K/2 \cdot \exp(2\pi j \cdot \alpha \cdot \cos \phi) \cdot S_p + \Sigma_{q=1\ldots K/2} I_{1,p+q}.$$

Similarly it follows $$\Sigma_{q=K/2+1\ldots K} R_{2,p+q} \approx K/2 \cdot \exp(2\pi j \cdot 2\alpha \cdot \cos \phi) \cdot S_p + \Sigma_{q=K/2+1\ldots K} I_{2,p+q}.$$

This gives rise to the detection signal:

$$\left| \sum_{q=1\ldots K/2} R_{1,p+q} \right| + \left| \sum_{q=K/2+1\ldots K} R_{2,p+q} \right| \approx K \cdot S_p + \sum_{q=1\ldots K} \mathrm{Re}[I'_q],$$

where the $\{I'_q\}$ are i.i.d variables with the same distribution as $I_{k,p}$.

We note that the coherent sums lead to a factor of K in the signal-present terms, which translates to increased SINR in the detection signal. We may also calculate $$\Sigma_{q=K/2+1\ldots K} R_{2,p+q} \cdot \Sigma_{q=1\ldots K} R^*_{1,p+q} \approx K^2/4 \cdot \exp(2\pi j \cdot \alpha \cdot \cos \phi) \cdot S_p^2,$$

from which the DOA estimate given above may be derived.

In FIG. 4 and FIG. 5 we have discussed and described different embodiments of an apparatus for determining whether a desired signal is present in a received signal in a CDMA system. Preferably, the received signal is an inbound signal in a wideband CDMA system and the desired signal is a control channel signal having control symbols and corresponding to a subscriber unit. The first, second, and additional correlations result from a sum of chip rate correlations at the first, second, and additional elements of the antenna array. Determining the signal magnitude includes finding a discrete Fourier transform (DFT) of the first, second, and additional correlations or a magnitude of the first and second correlation. The DFT has a plurality of terms with each having a magnitude and corresponding to a unique direction of arrival of the received signal, where the magnitude of any of the plurality of terms that satisfies the threshold indicates that the desired signal is likely present at the unique direction of arrival corresponding to the term.

Figure 6:
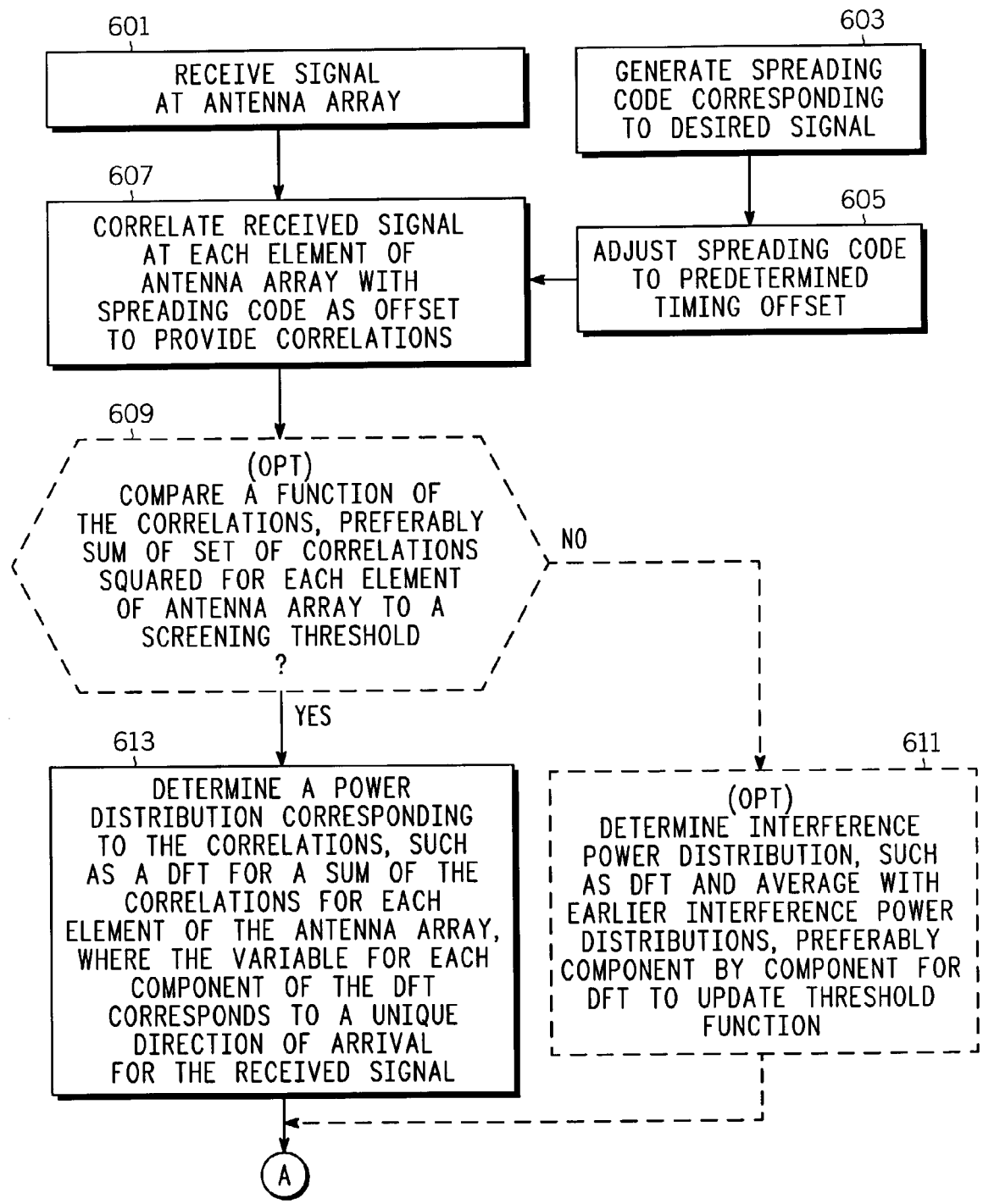
FIG. 6 and FIG. 7 depict a flow chart of a preferred method of determining whether a received signal includes a desired signal according to the present invention.
Figure 7:
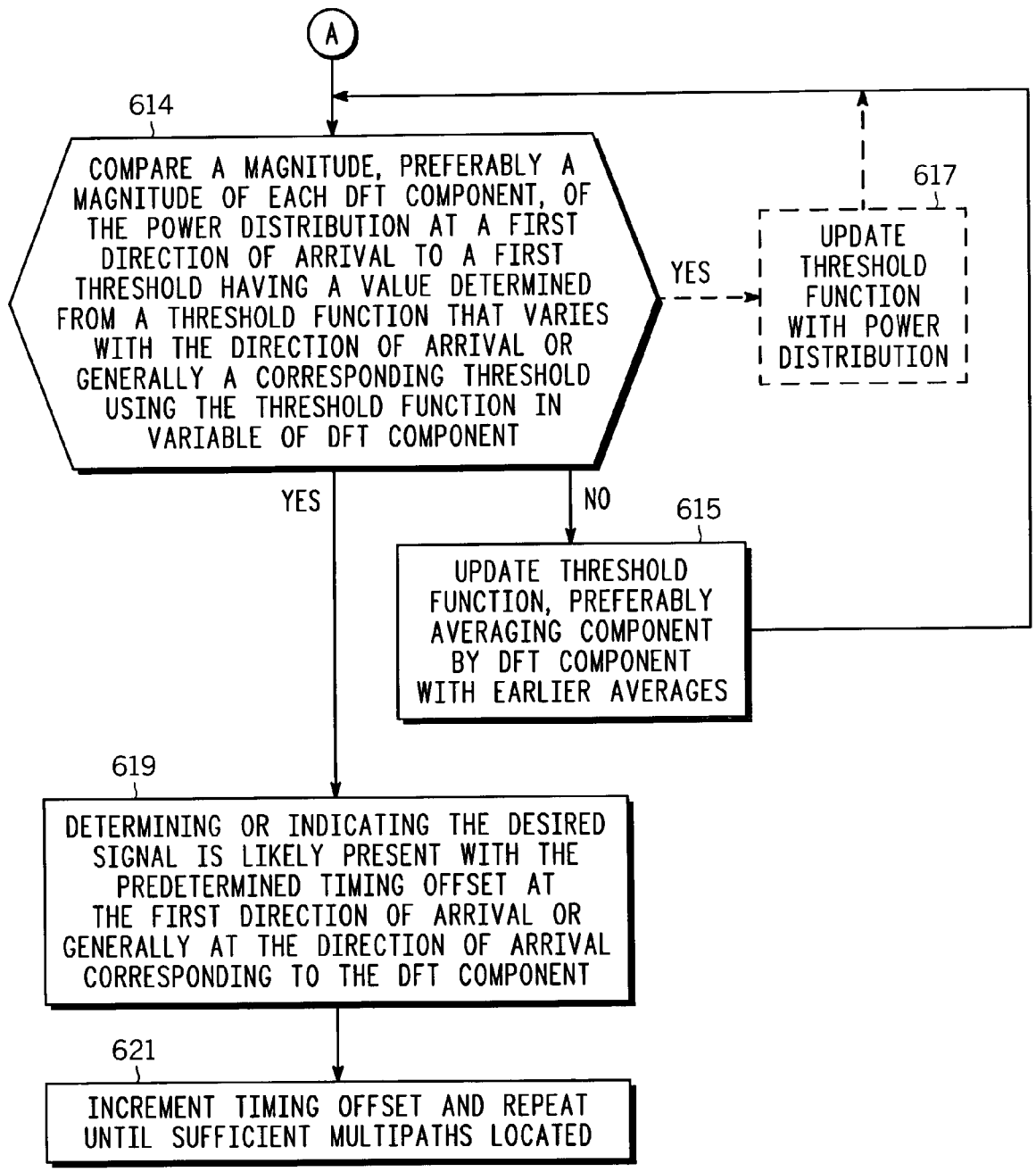

Referring to FIG. 6 and FIG. 7 a flow chart of a preferred method of determining whether a received signal includes a desired signal will be discussed and described. This method may be advantageously practiced by the data processing system of FIG. 2 for example. This description will be at an overview level as much of the material has been discussed above in a different embodiment. FIG. 6 and FIG. 7 shows a method of determining whether a received signal in a Code Division Multiple Access system that uses an antenna array includes a desired signal with a predetermined timing offset. The method includes receiving a signal at an antenna array 601 and generating a spreading code corresponding to the desired signal at 603 and adjusting the spreading code to a predetermined timing offset 605. Then 607 indicates correlating the received signal with the spreading code corresponding to the desired signal at each element of the antenna array to provide correlations, the spreading code having the predetermined timing offset from 605. Optional screening procedure 609 compares a function of the correlations, preferably a sum of a set of correlation squared for each element of the antenna array to a screening threshold. If the screening threshold is not met or satisfied then optional process 611 may be performed for some fraction of those cases. At 611 determining an interference power distribution, such as a DFT and averaging with earlier interference power distributions, preferably DFT component by component, to update a threshold function is undertaken with the result being supplied to 614 (FIG. 7).

If optional processes 609 and 611 are not included or the screening threshold at 609 is satisfied, then 613 shows determining a power distribution corresponding to the correlations, such as a DFT for a sum of the correlations for each element of the antenna array, where the variable for each component of the DFT corresponds to a unique direction of arrival for the received signal. Then 614 (FIG. 7) compares a magnitude of the power distribution at a first direction of arrival to a first threshold that has a value determined from a threshold function that varies with the direction of arrival or generally a corresponding threshold using the threshold function valued at the variable for the DFT component or term. If the threshold is not satisfied than 615 shows updating the threshold function, preferably by averaging component by DFT component with earlier averages with the result or results being returned to 614. Note that when the threshold is satisfied optional process 617 can use the power distribution to update the threshold function with the result or results being returned to 614. Furthermore when the first threshold is satisfied 619 will determine or indicating that the desired signal is likely present with the predetermined timing offset at the first direction of arrival or more generally at the direction of arrival corresponding to the DFT component that satisfied the threshold. Then 621 shows incrementing the timing offset and repeating the process until sufficient multipaths are located.

Figure 8:
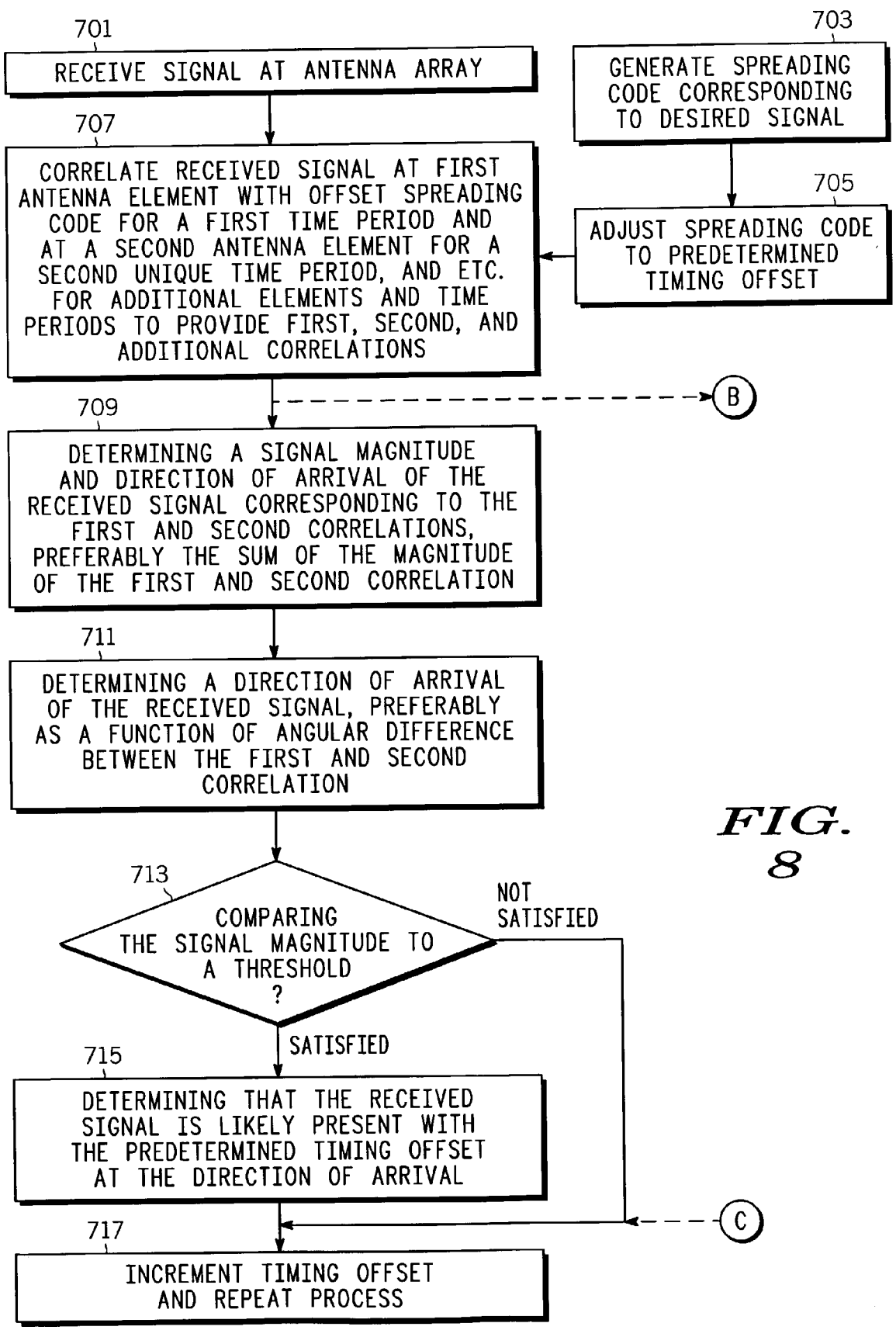
FIG. 8 and FIG. 9 show alternative method embodiments of determining whether a received signal includes a desired signal according to the present invention.
Figure 9:
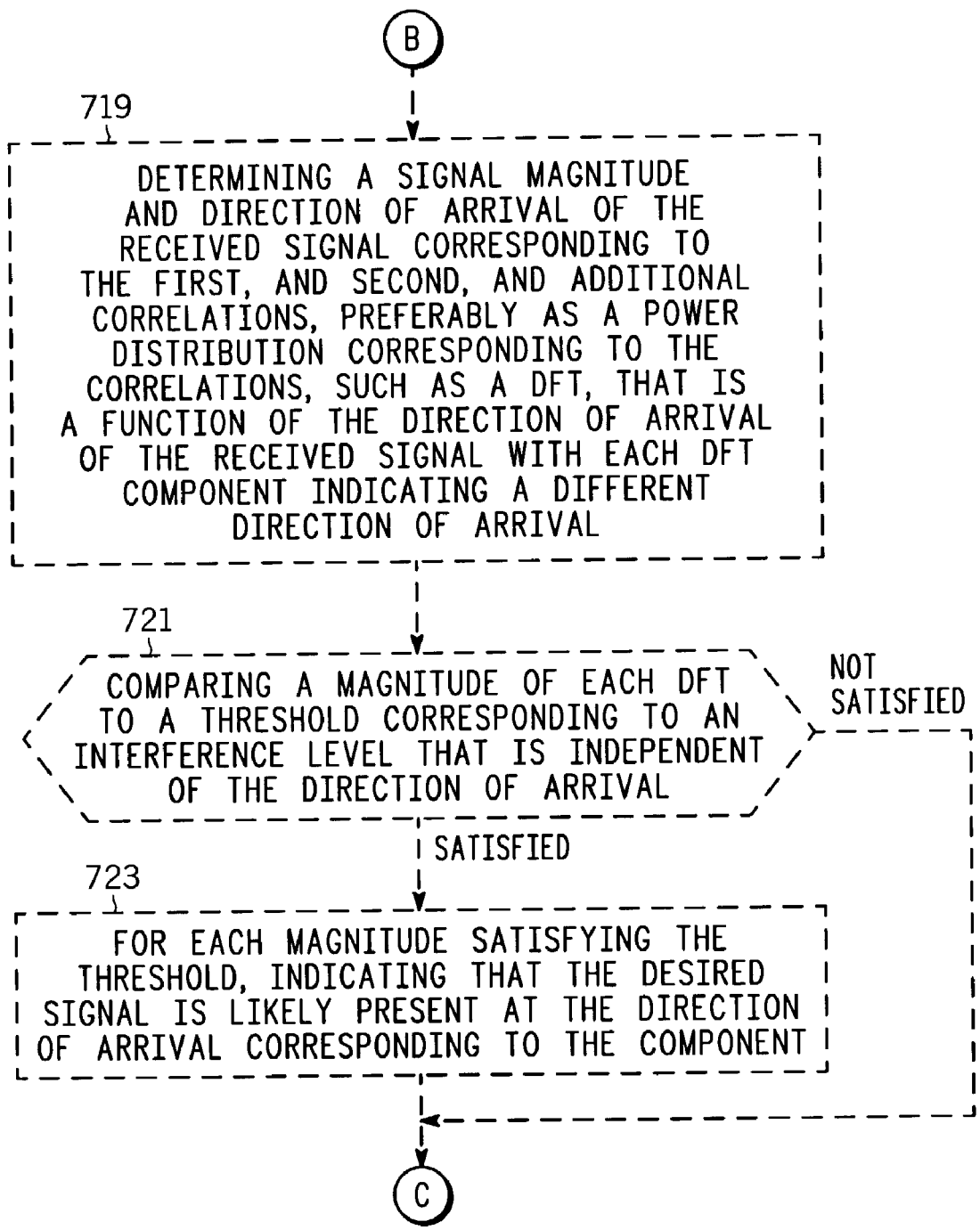

Referring to FIG. 8 and FIG. 9 a flow chart of alternative method embodiments of determining whether a received signal includes a desired signal will be discussed and described. The methods of FIG. 8 and FIG. 9 may be advantageously performed by the apparatus shown in FIG. 4 and FIG. 5. This description will be at an overview level as much of the material has been discussed above in a different embodiment. FIG. 8 and FIG. 9 show methods of determining whether a received signal in a Code Division Multiple Access system that uses an antenna array includes a desired signal with a predetermined timing offset. The methods include receiving a signal at an antenna array 701 and generating a spreading code corresponding to the desired signal at 703 and adjusting the spreading code to a predetermined timing offset 705. Then 707 shows correlating the received signal with the spreading code corresponding to the desired signal at a first element of the antenna array for a first time period to provide a first correlation and at a second element of the antenna array for a second time period that excludes the first time period to provide a second correlation and so on at additional elements for additional time periods to provide additional correlations, the spreading code having the predetermined timing offset from 705.

At 709 determining a signal magnitude and a direction of arrival of the received signal corresponding to the first and second correlation, preferably a sum of the magnitude of the first and second correlation is performed. At 711 determining a direction of arrival of the received signal, preferably as a function of an angular difference between the first and second correlations is performed. Then comparing the signal magnitude to a threshold is undertaken at 713 and when the threshold is satisfied 715 determines that the desired signal is likely present with the predetermined timing offset at the direction of arrival and then or whenever the threshold is not satisfied 717 increments the timing offset and the process repeats until sufficient multipaths are found.

As one alternative to 709, 711, 713, and 715 the procedures (FIG. 9) defined by 719, 721, and 723 may be performed. At 719 the process determines a signal magnitude and a direction of arrival of the received signal corresponding to the first, second, and additional correlations, preferably as a power distribution corresponding to the correlations, such as a DFT that is a function of the direction of arrival of the received signal with each DFT component indicating a different direction of arrival. Then 721 compares a magnitude of each DFT component to a threshold corresponding to an interference level that is independent of the direction of arrival. Then 723 when the magnitude of any one of the components satisfies the threshold, indicates that the desired signal is likely present with the predetermined timing offset at a direction of arrival corresponding to that component. When the threshold is not satisfied or after 723 the process at 717 is undertaken.

Simulations of the above processes have shown consistent improved results over prior art searchers that have not taken into consideration the statistical properties of interference as presented to an adaptive antenna array. The methods and apparatus, discussed above, and the inventive principles and concepts thereof are intended to and will alleviate problems caused by prior art blind data rate determination processes. Using the principles of discussed, disclosed and described herein promises to dramatically reduce bandwidth requirements for variable data rate receivers and thus costs and complexities thereof.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of determining whether a received signal in a Code Division Multiple Access system that uses an antenna array includes a desired signal with a predetermined timing offset, the method comprising:
    correlating the received signal with a spreading code corresponding to the desired signal at each element of the antenna array to provide correlations, said spreading code having the predetermined timing offset;
    determining a power distribution corresponding to the correlations that is a function of a direction of arrival of the received signal;
    comparing a magnitude of said power distribution at a first direction of arrival to a first threshold that has a value determined from a threshold function that varies with said direction of arrival; and
    when the first threshold is satisfied determining that said desired signal is likely present with the predetermined timing offset at said first direction of arrival.

2. The method of claim 1 further including executing a preliminary search by comparing a function of said correlations to a screening threshold and when said screening threshold is satisfied, performing said determining said power distribution.

3. The method of claim 2 wherein said function is a sum of a set of said correlations squared corresponding to said each element of the antenna array and the method further includes when said screening threshold is not satisfied updating said threshold function by finding an interference power distribution and averaging said interference power distribution with earlier interference power distributions.

4. The method of claim 1 wherein said determining said power distribution further includes determining a discrete Fourier transform (DFT) corresponding to a set of said correlations from said each element of the antenna array, the variable of each component of said DFT corresponding to a unique direction of arrival for the received signal.

5. The method of claim 4 wherein said comparing said magnitude of said power distribution further includes comparing a magnitude of said each component of said DFT to a corresponding threshold that has a value determined from said threshold function using said variable of said each component.

6. The method of claim 5 further including, when said magnitude of any one of said each component satisfies said corresponding threshold, indicating that said desired signal is likely present with the predetermined timing offset at a direction of arrival corresponding to said variable of said one of said each component.

7. The method of claim 1 further including developing said threshold function using said power distribution.

8. The method of claim 7 wherein said developing said threshold function further includes, for each of a plurality of directions of arrival, averaging a corresponding magnitude of said power distribution with an earlier average corresponding to each of said plurality of directions of arrival to provide an updated average value for said each of said plurality of directions of arrival.

9. The method of claim 1 wherein the received signal is an inbound signal in a wideband CDMA system and the desired signal is a control channel signal having control symbols and corresponding to a subscriber unit, said correlations for each element of the antenna array are coherently summed to provide a plurality of symbols, one each for said each element, said determining said power distribution includes finding a discrete Fourier transform (DFT) of said plurality of said symbols, said DFT having a plurality of terms with each corresponding to a unique direction of arrival of the received signal, said threshold function having a value for each said unique direction of arrival corresponding to an average of each of said plurality of terms when the desired signal is not present.

10. A data processing system arranged and operable for determining whether a received signal at a Code Division Multiple Access receiver that is coupled to an antenna array includes a desired signal with a predetermined timing offset, the data processing system comprising:
    a correlation unit for correlating the received signal with a spreading code corresponding to the desired signal at each element of the antenna array to provide correlations, said spreading code having the predetermined timing offset; and
    a processing unit for:
        determining a power distribution corresponding to the correlations that is a function of a direction of arrival of the received signal;
        comparing a magnitude of said power distribution at a first direction of arrival to a first threshold that has a value determined from a threshold function that varies with said direction of arrival; and when the first threshold is satisfied determining that said desired signal is likely present with the predetermined timing offset at said first direction of arrival.

11. The data processing system of claim 10 wherein said processing unit is further for executing a preliminary search by comparing a function of said correlations to a screening threshold and when said screening threshold is satisfied, performing said determining said power distribution.

12. The data processing system of claim 11 wherein said function is a sum of a set of said correlations squared corresponding to said each element of the antenna array and when said screening threshold is not satisfied, said processing unit is further for updating said threshold function by finding an interference power distribution and averaging said interference power distribution with earlier interference power distributions.

13. The data processing system of claim 10 wherein said processing unit is further for determining a discrete Fourier transform (DFT) corresponding to a set of said correlations from said each element of the antenna array, the variable of each component of said DFT corresponding to a unique direction of arrival for the received signal.

14. The data processing system of claim 13 wherein said processing unit for comparing said magnitude of said power distribution is further for comparing a magnitude of said each component of said DFT to a corresponding threshold that has a value determined from said threshold function using said variable of said each component.

15. The data processing system of claim 14 wherein, when said magnitude of any one of said each component satisfies said corresponding threshold, said processing unit is further for indicating that said desired signal is likely present with the predetermined timing offset at a direction of arrival corresponding to said variable of said one of said each component.

16. The data processing system of claim 10 wherein said processing unit is further for developing said threshold function using said power distribution.

17. The data processing system of claim 16 wherein for each of a plurality of directions of arrival, said processing unit for said developing said threshold function is further for averaging a corresponding magnitude of said power distribution with an earlier average corresponding to each of said plurality of directions of arrival to provide an updated average value for said each of said plurality of directions of arrival.

18. The data processing system of claim 10 wherein the received signal is an inbound signal in a wideband CDMA system and the desired signal is a control channel signal having control symbols and corresponding to a subscriber unit, said correlations for each element of the antenna array are coherently summed to provide a plurality of symbols, one each for said each element, said determining said power distribution includes finding a discrete Fourier transform (DFT) of said plurality of said symbols, said DFT having a plurality of terms with each corresponding to a unique direction of arrival of the received signal, said threshold function having a value for each said unique direction of arrival corresponding to an average of each of said plurality of terms when the desired signal is not present.

19. A method of determining whether a received signal in a Code Division Multiple Access system that uses an antenna array includes a desired signal with a predetermined timing offset, the method comprising:

correlating the received signal with a spreading code corresponding to the desired signal at a first element of the antenna array for a first time period to provide a first correlation and at a second element of the antenna array for a second time period that excludes said first time period to provide a second correlation, said spreading code having the predetermined timing offset;

determining a signal magnitude and a direction of arrival of the received signal corresponding to said first and said second correlation;

comparing said signal magnitude to a threshold; and when said threshold is satisfied determining that said desired signal is likely present with the predetermined timing offset at said direction of arrival.

20. The method of claim 19 further including correlating the received signal with said spreading code corresponding to the desired signal at additional elements of the antenna array for additional unique time periods to provide additional correlations.

21. The method of claim 20 wherein said determining said signal magnitude further includes determining a power distribution corresponding to said first correlation, said second correlation, and said additional correlations, that is a function of said direction of arrival of the received signal.

22. The method of claim 21 wherein said determining a power distribution further includes determining a discrete Fourier transform (DFT) corresponding to said first correlation, said second correlation, and said additional correlations.

23. The method of claim 22 wherein said comparing said signal magnitude further includes comparing a magnitude of each component of said DFT to said threshold, said threshold corresponding to an interference level that is independent of said direction of arrival.

24. The method of claim 23 further including, when said magnitude of any one of said components satisfies said threshold, indicating that the desired signal is likely present with the predetermined timing offset at a direction of arrival corresponding to said any one of said components.

25. The method of claim 19 wherein said determining said signal magnitude further includes determining a sum of a magnitude of said first correlation and a magnitude of said second correlation.

26. The method of claim 19 wherein said direction of arrival of the received signal is a function of an angular difference between said first correlation and said second correlation.

27. The method of claim 19 wherein said first correlation is provided using a first portion of said spreading code and said second correlation is provided using a second portion of said spreading code.

28. The method of claim 20 wherein the received signal is an inbound signal in a wideband CDMA system and the desired signal is a control channel signal having control symbols and corresponding to a subscriber unit, said first, said second, and said additional correlations resulting from a sum of chip rate correlations at said first, said second, and said additional elements of the antenna array, said determining said signal magnitude includes finding a discrete Fourier transform (DFT) of said first, said second, and said additional correlation, said DFT having a plurality of terms with each having a magnitude and corresponding to a unique direction of arrival of the received signal, said magnitude of any of said plurality of terms that satisfies said threshold indicating that the desired signal is likely present at said unique direction of arrival corresponding to said any of said plurality of terms.

29. A data processing system arranged and constructed for determining whether a received signal at a Code Division Multiple Access receiver that is coupled to an antenna array includes a desired signal with a predetermined timing offset, the data processing system comprising:
   a correlation unit for correlating the received signal with a spreading code corresponding to the desired signal at a first element of the antenna array for a first time period to provide a first correlation and at a second element of the antenna array for a second time period that excludes said first time period to provide a second correlation, said spreading code having the predetermined timing offset; and
   a processing unit for:
      determining a signal magnitude and a direction of arrival of the received signal corresponding to said first and said second correlation,
      comparing said signal magnitude to a threshold, and
      when said threshold is satisfied determining that said desired signal is likely present with the predetermined timing offset at said direction of arrival.

30. The data processing system of claim 29 wherein said correlation unit further correlates the received signal with said spreading code corresponding to the desired signal at additional elements of the antenna array for additional unique time periods to provide additional correlations.

31. The data processing system of claim 30 wherein said processing unit for said determining said signal magnitude is further for determining a power distribution corresponding to said first correlation, said second correlation, and said additional correlations, that is a function of said direction of arrival of the received signal.

32. The data processing system of claim 31 wherein said processing unit for determining said power distribution is further for determining a discrete Fourier transform (DFT) corresponding to said first correlation, said second correlation, and said additional correlations.

33. The data processing system of claim 32 wherein said processing unit for said comparing said signal magnitude is further for comparing a magnitude of each component of said DFT to said threshold, said threshold corresponding to an interference level that is independent of said direction of arrival.

34. The data processing system of claim 33 wherein said processing unit, when said magnitude of any one of said components satisfies said threshold, is further for indicating that the desired signal is likely present with the predetermined timing offset at a direction of arrival corresponding to said any one of said components.

35. The data processing system of claim 29 wherein said processing unit for said determining said signal magnitude is further for determining a sum of a magnitude of said first correlation and a magnitude of said second correlation.

36. The data processing system of claim 29 wherein said processing unit determines said direction of arrival of the received signal as a function of an angular difference between said first correlation and said second correlation.

37. The data processing system of claim 29 wherein said correlation unit provides said first correlation using a first portion of said spreading code and said second correlation using a second portion of said spreading code.

38. The data processing system of claim 30 wherein the received signal is an inbound signal in a wideband CDMA system and the desired signal is a control channel signal having control symbols and corresponding to a subscriber unit, said first, said second, and said additional correlations resulting from a sum of chip rate correlations at said first, said second, and said additional elements of the antenna array, said determining said signal magnitude includes finding a discrete Fourier transform (DFT) of said first, said second, and said additional correlation, said DFT having a plurality of terms with each having a magnitude and corresponding to a unique direction of arrival of the received signal, said magnitude of any of said plurality of terms that satisfies said threshold indicating that the desired signal is likely present at said unique direction of arrival corresponding to said any of said plurality of terms.

39. A software program that when installed and executing on a programmable integrated circuit will result in the programmable integrated circuit facilitating determination of whether a received signal in a Code Division Multiple Access system that uses an antenna array includes a desired signal with a predetermined timing offset, the software program including instructions that perform a method comprising:
   determining a power distribution corresponding to correlations provided by correlating the received signal with a spreading code corresponding to the desired signal at a plurality of elements of the antenna array, said power distribution being a function of a direction of arrival of the received signal;
   comparing a magnitude of said power distribution at a first direction of arrival to a first threshold that has a value determined from a threshold function that varies with said direction of arrival; and
   when the first threshold is satisfied determining that said desired signal is likely present with the predetermined timing offset at said first direction of arrival.

40. The software program of claim 39 wherein said determining a power distribution further includes determining a discrete Fourier transform (DFT) corresponding to a set of said correlations from said each element of the antenna array, the variable of each component of said DFT corresponding to a unique direction of arrival for the received signal.

41. The software program of claim 40 wherein said comparing said magnitude of said power distribution further includes comparing a magnitude of said each component of said DFT to a corresponding threshold that has a value determined from said threshold function using said variable of said each component.

42. The software program of claim 41 further including, when said magnitude of any one of said each component satisfies said corresponding threshold, indicating that said desired signal is likely present with the predetermined timing offset at a direction of arrival corresponding to said variable of said one of said each component.

43. The software program of claim 39 further including developing said threshold function using said power distribution.

* * * * *